May 30, 1933.  R. W. LYTLE  1,912,082

SILENT GEAR

Filed Oct. 1, 1931

Inventor:
Robert W. Lytle.
By Dyrenforth, Lee, Chritton & Wiles
Attys.

Patented May 30, 1933

1,912,082

UNITED STATES PATENT OFFICE

ROBERT W. LYTLE, OF CINCINNATI, OHIO, ASSIGNOR TO THE FORMICA INSULATION COMPANY, OF CINCINNATI, OHIO, A CORPORATION OF OHIO

SILENT GEAR

Application filed October 1, 1931. Serial No. 566,353.

This invention relates particularly to wheels, or gears, composed largely, or entirely, if desired, of fibrous material impregnated with a binder adapted to be hardened by heat, the structure being consolidated under heat and pressure.

The primary object of the present inventtion is to provide a molded wheel of great strength, avoiding waste of materials in the manufacture.

The invention is illustrated in a preferred embodiment in the accompanying drawing, in which—

Figure 1:
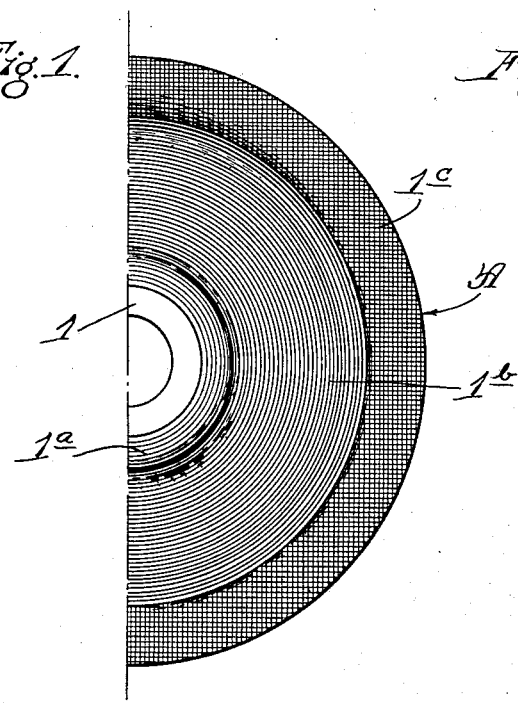
Figure 2:
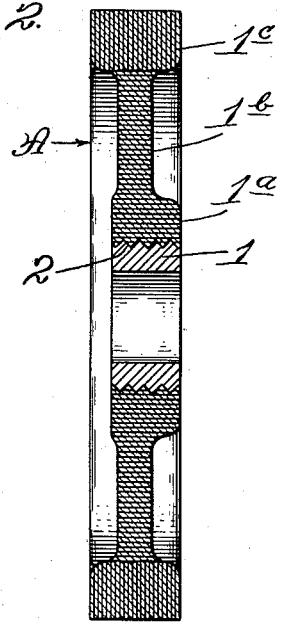
Figure 3:
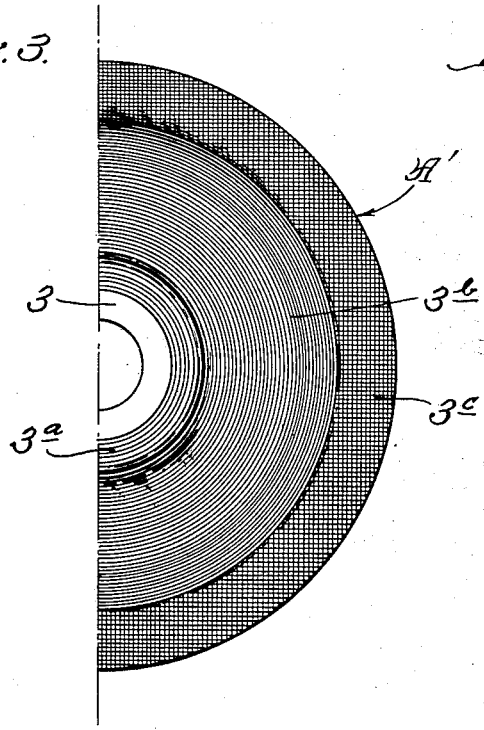

Fig. 1 is a broken plan view of a gear-blank, or wheel, made in accordance with the invention; Fig. 2, a sectional view of the wheel; Fig. 3, a plan view of a modified form; and Fig. 4, a sectional view of the form shown in Fig. 3.

In accordance with the present invention, a wheel-center is formed by wrapping a strip of impregnated fabric upon itself so that the layers are concentric with the axis of the wheel; forming a rim-portion of impregnated strips of fabric which lie in a plane at right angles to the axis of the wheel, and introducing the structure into a mold and consolidating the structure under heat and pressure.

Figure 4:
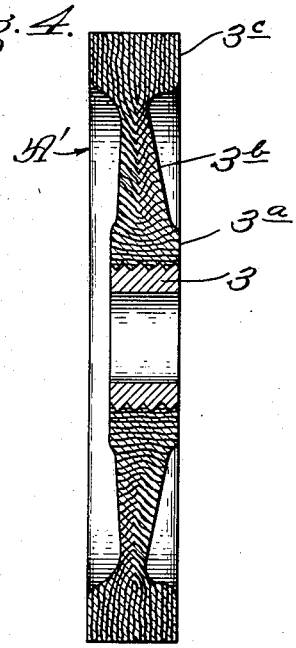

The dies may be such as to produce the result shown in Fig. 2, in which the layers forming the hub and web portions remain substantially parallel with the axis of the wheel; or the dies may be such as to produce the effect illustrated in Fig. 4, in which the layers forming the web are folded into somewhat angular form, approximating more and more an acute V-shape as the rim is approached. The edge portions of the V-s become more or less parallel to and interlaced with the inner portions of the strips which form the rim, which, as stated, lie in a plane at right angles to the axis of the wheel.

Referring to Figs. 1 and 2, A designates a gear-blank comprising a metallic hub-center 1, a surrounding hub-portion of laminated stock $1^a$, a web-portion $1^b$ and a rim $1^c$.

The structure is formed by winding upon the metal member 1 a strip of fabric impregnated with a solution of resin adapted to harden under heat and pressure; by then winding upon the portion $1^a$ a narrower tape impregnated with a binder of the same character; and by then applying rings of fabric impregnated with a binder of the same character to provide the rim $1^c$.

The structure is introduced into a mold and consolidated under heat and pressure, the form of the dies being such as to produce the effect shown in Fig. 2.

The binder employed preferably is a phenolic condensation product, such as bakelite, adapted to harden under heat. In the operation of pressing in heated dies, the binder is converted to a hard, resistant condition. That is, it becomes infusible and strongly insoluble.

After the pressing operation, the gear-blank may be subjected to heat treatment in a bath of heated oil for a prolonged period. It may be heated for a time, for example, at about 60° C, and thereafter it may be heated in an oil bath at a temperature of about 90 to 100° C.

The consolidating operation in dies is performed at known pressures and temperatures, ordinarily a temperature of about 175° C. and a pressure of in the neighborhood of two thousand pounds per square inch. In the pressing operation, the dies may be relieved, one or more times, to permit escape of gases. In the treatment in a heated bath or baths, it may be continued for a period of 30-60 hours, gases are permitted to escape and the gear-blank shrinks in such manner as to more firmly bind the hub-portion $1^a$ upon the metal hub-portion 1. Preferably the outer circumferential surface of the member 1 is provided with projections, as indicated at 2. These projections may be formed by diagonal cross cuts, the cuts crossing each other.

Thus, the laminated structure is firmly secured to the metal bushing in such manner as to resist both torsional and lateral strains. If desired, the metal bushing may be omitted from the structure.

In the modification shown in Figs. 3 and 4, the gear-blank is designated A'. It is shown as comprising a central bushing 3, a hub-portion 3ª, a web-portion 3ᵇ, and a rim 3ᶜ. In this modification, the structure is formed as described above and consolidated in a heated mold provided with walls adapted, in the pressing operation, to force the edge portions of the tape forming the web to be directed more and more towards the rim, as the rim is approached. Thus, the strips forming the web are folded into angular shape, somewhat resembling a V, the acuteness of the V becoming more and more pronounced, as the rim is approached. The edge portions of the outer circles of the laminations forming the web intermingle to a certain extent with the inner portions of the layers which form the rim. The angular shape of the laminations makes the web strongly resistant to side thrust, as well as strongly resistant to radial forces.

It may be remarked, also, that in the form shown in Fig. 2, the web is strongly resistant to lateral thrusts.

Instead of a phenolic condensation product, any suitable artificial resin adapted to harden under heat and pressure may be employed, such as a suitable furfural resin, a resin of the urea-formaldehyde type, or the like.

In building up the rim of the structure, preparatory to molding, one may employ segments of impregnated cloth, or one may employ an impregnated fabric tape with V-notches at one edge, permitting the tape to be wound spirally with the layers parallel to each other and at right angles to the axis of the wheel.

The improved structure can be produced with a minimum of waste. Duck impregnated with a potentially reactive solution of bakelite and dried at moderate temperatures may be employed for forming the laminations. Any other suitable fabric may be employed.

If desired, in assembling the structure, a layer, or layers, of impregnated fabric may be used to cover the built-up structure previously described. Thus, the finished gear-blank will have a skin or covering of fabric concealing the laminations underneath.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A wheel comprising a web of concentric layers of fabric impregnated with a binder adapted to be hardened by heat, said layers having their edge-portions turned outwardly toward the rim; and a rim comprising layers of fabric impregnated with a binder of the same character and lying in a plane perpendicular to the axis of the wheel—said structure consolidated and hardened under heat and pressure.

2. A gear-blank having a web composed of a resin impregnated strip of fabric wound spirally about the axis of the gear and having the edge-portions of the strip turned outwardly toward the rim, and a rim comprising resin impregnated layers of fabric lying in a plane perpendicular to the axis of the gear, said last-named layers intermeshing with edge-portions of laminations of the web—said structure molded and consolidated under heat and pressure.

3. A wheel comprising a web having laminations wound concentrically with the axis of the wheel and a rim of fibrous material encircling said web, said web and fibrous material being united by a binder which hardens under heat and pressure and consolidated into a hard, resistant mass, some of said laminations having their edge portions turned outwardly towards said rim and consolidated therewith.

ROBERT W. LYTLE.